United States Patent [19]
Idel et al.

[11] 4,185,009
[45] Jan. 22, 1980

[54] BRANCHED, HIGH-MOLECULAR WEIGHT THERMOPLASTIC POLYCARBONATES

[75] Inventors: Karsten-Josef Idel; Dieter Frietag; Werner Nouvertne, all of Krefeld, Fed. Rep. of Germany

[73] Assignee: Bayer Aktiengesellschaft, Leverkusen, Fed. Rep. of Germany

[21] Appl. No.: 845,689

[22] Filed: Oct. 26, 1977

Related U.S. Application Data

[63] Continuation-in-part of Ser. No. 644,253, Dec. 24, 1975, abandoned.

[30] Foreign Application Priority Data

Jan. 3, 1975 [DE] Fed. Rep. of Germany ....... 2500092

[51] Int. Cl.$^2$ .......................... C08G 63/62; C09K 3/28
[52] U.S. Cl. .......................... 260/45.9 R; 260/45.7 R; 260/45.7 S; 260/DIG. 24; 528/171; 528/199; 528/202; 528/203

[58] Field of Search ............... 260/47 XA, 49, 45.7 S, 260/45.7 SF, 45.7 R, 45.9 R, DIG. 24; 528/203, 196

[56] References Cited
U.S. PATENT DOCUMENTS 3,256,242  6/1966  Morgan .................................. 260/47
3,775,367  11/1973  Nouvertne' ...................... 260/45.9 R Primary Examiner—Theodore E. Pertilla
Attorney, Agent, or Firm—Gene Harsh; Lawrence S. Pope

[57] ABSTRACT

The invention relates to a process for the preparation of branched, thermoplastic, high-molecular weight and soluble polycarbonates having improved properties, by incorporation of 3,3-bis-(4-hydroxyaryl)-oxindoles as a branching agent. The invention further relates to the polycarbonates obtained in accordance with this process.

24 Claims, No Drawings

BRANCHED, HIGH-MOLECULAR WEIGHT THERMOPLASTIC POLYCARBONATES

This application is a continuation-in-part of our co-pending application Ser. No. 644,253 filed Dec. 24, 1975 now abandoned.

BACKGROUND OF THE INVENTION

It is known to prepare high-molecular weight, linear, soluble, thermoplastic aromatic polycarbonates by reaction of bisphenols with polycarbonate-forming derivatives of carbonic acid under polycarbonate-forming reaction conditions, say according to the processes of German Patent Specifications Nos. 971,790; 971,777; 959,497; 1,007,996; 1,031,512 and 1,046,311. In contrast to most other plastics, melts of linear polycarbonates exhibit Newtonian flow in the range of low rates of deformation (=rates of shear), and non-Newtonian flow in the range of high rates of deformation. For extrusion processes, it is advantageous to have values of the apparent melt viscosity which are as high as possible. On the other hand, for processing by injection molding, it is desirable that the apparent melt viscosity should have values which are as low as possible. In spite of the non-Newtonian flow of linear polycarbonates in the range of high rates of deformation, such as occur during processing by injection molding, the accompanying lowering of the apparent melt viscosity is too slight—that is to say the apparent melt viscosity is still too high—for linear polycarbonates of high apparent melt viscosity to be employed for injection molding. For this reason, linear polycarbonates with low apparent melt viscosity are normally suitable for processing by injection molding and those with high apparent melt viscosity are normally suitable for extrusion processes. In other words, in general, it is not possible to employ one and the same linear polycarbonate, particularly if the apparent melt viscosity has a high value, both for processing by extrusion and for processing by injection molding.

Attempts have also been made to modify linear polycarbonates of high solution viscosity, through incorporation of functional bisphenols, in such a way that they show non-Newtonian flow in the range of very low rates of deformation (processing by extrusion), and hence exhibit high shape retention of the extruded ribbon. Such products are particularly suitable for the manufacture of hollow articles of large volume in accordance with the extrusion-blowing process (compare DT-OS (German Published Specification) No. 1,595,762).

Polyfunctional, especially trifunctional and tetrafunctional, phenols (compare DT-OS (German Published Specification) 1,595,641, DT-OS (German Published Specification) No. 1,570,533, DT-OS (German Published Specification) No. 2,039,536, U.S. Pat. No. 3,541,049, DT-OS (German Published Specification No. 2,113,347, U.S. Pat. No. 3,799,953 and DT-OS (German Published Specification) No. 2,254,918) or bisphenols having an additional radical capable of undergoing condensation such as, for example, the carboxyl group (compare DT-OS (German Published Specification) No. 1,595,762) are known as branching agents for aromatic polycarbonates.

In part, polyhydric phenols of functionality greater than two are only obtainable via expensive purification processes and at times show considerable differences in respect of the reactivity of the phenolic hydroxyl groups. A reduced reactivity of individual OH groups, especially of OH groups in middle positions, towards carbonate-forming compounds does not ensure complete incorporation of the compounds, so that greatly fluctuating degrees of branching must be expected. The free phenolic hydroxyl groups which are still present, because of the incomplete conversion, can lead to undesired discolorations of the material on repeated extrusion. For example, in the blow-molding process re-extrusions must be expected particularly frequently, since after trimming the hollow articles to the desired shape up to 20% of excess material arises, which must be added back to the next process cycle if it is desired to operate economically. Hence, it is only possible to incorporate those branching agents which even after repeated extrusion lead to at most very slight discolorations of the polycarbonate.

In the case of branching via cyanuric chloride, as described in U.S. Pat. No. 3,541,049, the functional groups of the branching agent again show a marked gradation in reactivity. Furthermore, in the case of polycarbonate branched via cyanuric chloride, the material shows yellowing phenomena after exposure to light.

Again, in the case of the polyfunctional phenols described in DT-OS (German Published Specification) No. 1,595,762 especially bisphenol-acids, the incorporation achieved is at times only 75%.

The ortho-esters described in DT-OS (German Published Specification) No. 2,254,918 and U.S. Pat. No. 3,897,392 have the disadvantage that in the solution condensation process the branched polycarbonates are not obtained directly; instead, the ortho-esters must first be converted into sufficiently reactive branching agent precondensates by an intermediate reaction with aromatic dihydroxy compounds.

Further, it was known from U.S. Patent No. 3,256,242 to manufacture aromatic polyesters containing chlorine by condensation of chloroisophthalic acid dichloride with bis-(4-hydroxyphenyl)-oxindole in equimolar ratios at 150°–250° C. This gave solely linear polyesters but no crosslinked or branched products and no polyester-imides, as can be seen from the structural formulae and examples in the above specification. In other words, under the conditions of the condensation disclosed in the above specification, the formation of linear ester bonds is preferred, since otherwise the amide group of the oxindole would also, at least partially, have to undergo a condensation, even if the reactants are employed in the equimolar ratio instead of employing 1.5 mols of dicarboxylic acid per mol of bis-(4-hydroxyphenyl)-oxindole.

It was the object of the present invention to discover a new branching agent for linear, in particular aromatic, polycarbonates, which is practically completely incorporated into the polycarbonate molecule in the processes of phase boundary condensation, solution condensation and melt condensation customary for the preparation of polycarbonates, so that discolorations largely do not occur, even on repeated extrusion. Furthermore, the branching agent, even if employed in small amounts, should impart a pronounced structural viscosity behavior to the branched polycarbonates obtained so that a grade of polycarbonate is equally suitable for processing by extrusion and processing by injection molding, that is to say the branched polycarbonates should, in the range of rates of deformation which are used for processing by extrusion and processing by injection molding, exhibit a marked dependence of the apparent melt viscosity on the particular rate of deformation. At the same time, the apparent melt viscosity should be as high as possible at low rates of deformation (extrusion) and as low as possible at high rates of deformation (processing by injection molding).

The object has been achieved by employing 3,3-bis-(4-hydroxyaryl)-oxindoles (hereafter also referred to as isatin-bisphenols) for the manufacture of high-molecular weight, thermoplastic, soluble and branched polycarbonates.

SUMMARY OF THE INVENTION

Accordingly, the subject of the invention is a process for the preparation of thermoplastic, branched, high-molecular weight and soluble polycarbonates having improved properties, by condensation of difunctional aromatic halogen-free or halogen-containing dihydoxy compounds or their mixtures in the presence of about 0.05 to 2 mol% of a branching agent and about 0.1–8.0 mol% of a monofunctional aromatic hydroxy compound, in each case relative to the mols (100 mol%) of the difunctional aromatic dihydroxy compounds, with phosgene, bischlorocarbonic acid esters or other compounds which form a carbonyl group, in solution or by means of a phase boundary reaction, at temperatures of about 20 to 80° C., or with carbonic acid diaryl esters in the melt at temperatures of about 150° to 300° C., characterized in that the branching agents employed are 3,3-bis-(4-hydroxyaryl)oxindoles which correspond to the formula I

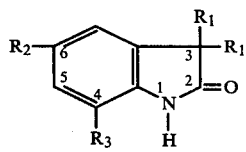

wherein
$R_1$ denotes a 4-hydroxyaryl radical and
$R_2$ and $R_3$ can be identical or different and denote hydrogen or halogen.

Preferably, $R_1$ denotes a 4-hydroxyphenyl or 4-hydroxynaphthyl radical or a radical of the formula II

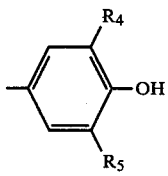

wherein
$R_4$ and $R_5$ can be identical or different and denote halogen, such as chlorine and bromine, methyl, ethyl, especially methyl, or hydrogen.

Particularly preferentially, $R_1$ is the 4-hydroxyphenyl radical.

Preferably, $R_2$ and/or $R_3$ denote hydrogen, chlorine or bromine, especially hydrogen.

A further subject of the invention are the polycarbonates obtained in accordance with the process of the invention.

DETAILED DESCRIPTION OF THE INVENTION

In view of the statements in U.S. Pat. No. 3,256,242, according to which the amide group of 3,3-bis-(4-hydroxyphenyl)-oxindole (isatin-bisphenol) does not enter into the reaction when the compound is reacted with dicarboxylic acid chlorides, and accordingly only linear, unbranched polyesters are obtained, it is surprising that isatin-bisphenols react, under polycarbonate-forming reaction conditions, not only via the two phenolic hydroxyl groups but also via the carboxylic acid amide group. Furthermore, it is extremely remarkable that the isatin-bisphenols are incorporated almost completely into the polycarbonate so that even if small amounts of isatin-bisphenols are used, extremely effective branching is achieved. The polycarbonates obtain according to the invention possess a particularly pronounced structural viscosity behavior and show, in the range of low rates of deformation, an apparent melt viscosity which is advantageous for extrusions and which drops, at high rates of deformation, to the point that processing by injection molding becomes possible, that is to say one and the same grade of polycarbonate can be processed both by extrusion processes and by injection molding processes.

In contrast to polycarbonates which contain cocondensed units of branching agents with phenolic hydroxyl groups which are sterically not completely free, for example, of 2,6-bis-(2'-hydroxy-5'-methyl-benzyl)-4-methylphenol (tris-cresol), the branched polycarbonates according to the invention are distinguished by excellent heat stability so that even after five-fold extrusion they show only a slight increase in the color number.

In addition, the extruded ribbon of the polycarbonates according to the invention possess high shape retention (melt strength), so that the polycarbonates are also suitable for the manufacture of hollow articles of large volume in accordance with the extrusion-blowing process.

The isatin-bisphenols of the formula I which serve as branching agents are obtained by the acid-catalyzed reaction of the corresponding isatins of the general formula III with monohydric phenols such as, for example, phenol and α-naphthol, which do not possess any substituents in the para-position to the phenolic hydroxyl group, or phenols of the general formula IV

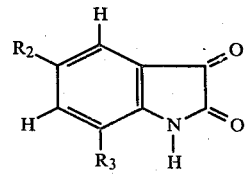

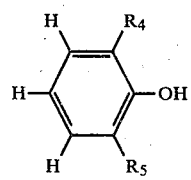

in which the radicals $R_2$, $R_3$, $R_4$ and $R_5$ have the same meaning as in the formulae I and II.

The isatin-bisphenols can be prepared in accordance with, or based on, the instructions of A. Baeyer and M. J. Lazarus, Berichte der deutschen Chem. Gesellschaft 18, 2637 (1885).

In the reaction, the phenolic component is employed, or initially introduced, in an up to ten-fold molar excess and the phenol melt at the same time serves as the solvent. The course of the reaction can be accelerated by adding acids, especially mineral acids, such as for example, $H_2SO_4$, $H_3PO_4$ and HCl. If the acid catalyst, for example, concentrated sulphuric acid, at the same time serves to bind the water which arises in the reaction, it can be added in amounts of up to 100% by weight, relative to the sum of the starting compounds.

The reaction is carried out at temperatures of about 20°–200° C., preferably of about 40°–160° C. The bisphenols which crystallize well can be isolated directly from the phenol melt. After extracting the excess phenol with water, alcohol or aromatics, such as benzene or toluene, the isatin-bisphenols can be purified by dissolving them in alkalis such as dilute sodium hydroxide solution or ammonia solution and subsequently precipitating them in acids, or by recrystallization from common solvents such as alcohol, glacial acetic acid, ethyl acetate or benzene.

Examples of suitable isatins for the preparation of isatin-bisphenols of the formula I are isatin, 5-chloroisatin, 7-chloroisatin, 5-bromoisatin, 7-bromoisatin, 5,7-dichloroisatin and 5,7-dibromoisatin. Isatin itself is preferred.

Suitable monohydric aromatic hydroxy compounds for regulating the molecular weight are monophenols such as m- and p-methylphenol, m- and p-ethylphenol, m- and p-propylphenol and m- and p-isopropylphenol, p-bromophenol and m- and p-butylphenol. p-Tert.-butylphenol is preferred.

In addition to bisphenol A, all other bisphenols can be used as the difunctional aromatic dihydroxyl compounds. Examples of suitable bisphenols are hydroquinone, resorcinol, 4,4'-dihydroxydiphenyl and bis-(hydroxyphenyl)-alkanes, -cycloalkanes, -sulphides, -ethers, -ketones, -sulphoxides or -sulphones, as well as $\alpha,\alpha'$-bis-(hydroxyphenyl)-diisopropylbenzene and the corresponding nuclear-alkylated and nuclear-halogenated compounds. Polycarbonates based on 4,4'-dihydroxydiphenylpropane-2,2 (bisphenol A), tetrachlorobisphenol A (2,2-bis-(3,5-dichloro-4-hydroxyphenyl)propane), tetrabromobisphenol A (2,2-bis-(3,5-dibromo-4-hydroxyphenyl)propane) and tetramethylbisphenol A (2,2-bis-(3,5-dimethyl-4-hydroxyphenyl)-propane) and on trinuclear bisphenol, such as $\alpha,\alpha'$-bis-(4-hydroxyphenyl)-p-diisopropylbenzene and mixtures of these compounds, are preferred. Bisphenol A is particularly preferred.

Preferred mixtures consist of about 0.5–99.5 mol %, preferably about 98–70 mol %, of bisphenol A and about 99.5–0.5 mol %, preferably about 2–30 mol % of tetrahalogenobisphenol A.

Further bisphenols suitable for the preparation of polycarbonate are described in U.S. Pat. Nos. 3,028,365; 2,999,835; 3,148,172; 3,271,368; 2,970,131; 2,991,273; 3,271,367; 3,280,078; 3,014,891 and 2,999,846.

The branched polycarbonates according to the invention can be obtained by phase boundary condensation and solution condensation at temperatures of about 20° to 80° C.

In the known phase boundary condensation, for example, the isatin-bisphenol is dissolved in sodium hydroxide solution together with the bisphenol component and a water-immiscible solvent, such as, for example, methylene chloride, dichloroethane or chlorobenzene, is added. After introducing phosgene at room temperature, the polycarbonates according to the invention are isolated directly in high yields from the organic phase by distilling off the solvent or by precipitation, and maximum incorporation of the branching agent is achieved. The chain length of the polycarbonates can be adjusted by adding a chain stopper, in most cases a monofunctional phenol such as, for example, phenol or p-tert.-butylphenol. The polycondensation can additionally be accelerated by tertiary amines, for example, triethylamine.

In the known solution condensation, phosgenation is carried out in solution in the absence of water and with at least a two-fold molar amount of pyridine, relative to phosgene employed, together with a co-solvent, such as, for example, methylene chloride. The pyridinium chloride produced, and excess pyridine, are removed by washing with dilute mineral acids and the polycarbonate solution obtained is worked up in the usual manner.

In the phase boundary process and solution process it is also possible to use, in addition to phosgene, other carbonyl halides, such as, for example, carbonyl fluoride and carbonyl bromide or their mixtures, or bis-halogenocarbonic acid esters of dihydroxy compounds, such as, for example, hydroquinone bis-chlorocarbonic acid ester, as carbonate-forming compounds.

In the known melt trans-esterification the bis-phenols are again reacted in the presence of about 0.05 to 2.0 mol % of branching agent and in the presence of a basic catalyst, such as sodium bis-phenolate, with carbonic acid diaryl esters, at temperatures of about 150° to 300° C. and with application of a vacuum, the phenol component arising from the trans-esterification being distilled off at the same time.

Examples of carbonic acid diaryl esters which can be employed are diphenyl carbonate, di-(halogenophenyl)-carbonates, such as di-(chlorophenyl)carbonate, di-(bromophenyl)carbonate, di-(trichlorophenyl)carbonate, di-(tribromophenyl)carbonate and the like, di-(alkylphenyl)carbonates, such as di-(tolyl)carbonate and the like, di-(naphthyl)carbonate, di-(chloronaphthyl)-carbonate, phenyl tolyl carbonate, chlorophenyl chloronaphthyl carbonate or mixtures.

In the formation of polycarbonates from either the solution polymerization reaction or the interfacial polycondensation reaction it is necessary to add chain stoppers such as monohydric phenols to the hydroxy compounds which are reacted with phosgene or bis-chlorocarbonic acid esters in order to obtain the desired polycarbonate product having the desired properties of this invention. However, in the transesterification reaction, i.e. in the case of the reaction of the bis-phenols with carbonic acid aryl esters in the melt, it is only necessary to add the branching agent in the above stated amounts and thus omit the addition of the monohydric phenols providing care is taken to prevent the monohydric phenol which is liberated by the reaction from the diaryl carbonate from being completely removed from the reaction mixture. As long as the monohydric phenol is present in the amount specified above, it will automatically participate in the synthesis of the polycarbonates.

In the co-condensation of bisphenol A with tetrahalogenobisphenols, for example, tetrabromobisphenol A, in accordance with the solution condensation, phase boundary condensation or melt condensation processes, the incorporation of the isatin-bisphenols results in a very particularly greatly reduced tendency to drip and excellent self-extinguishing burning behavior, which has not been observed, to this degree, with any of the previously known branching agents.

These halogen-containing polycarbonates branched via isatin-bisphenols attain classification 94 V-0 according to UL (Underwriter's Laboratories) burning test (subject 94), even in the case of thin test specimens of wall thickness 1/16 inch, and can, according to IBM test class A (Inflammability Testing of Plastics DMH 6-0430-102) be flamed for at least 60 seconds without producing burning drips or continuing to burn for more than 30 seconds, while the limit of the flame exposure time of the corresponding unbranched polycarbonate is merely 30–35 seconds.

The same excellent burning behavior is achieved by adding flameproofing additives, especially the alkali metal or ammonium perfluoroalkane $(C_1-C_8)$-sulphonates described in DT-OS (German Published Specifications) Nos. 1,930,257 and 2,253,072, and U.S. Pat. No. 3,775,367 within the limits of 0.005 to about 1% by weight, to branched halogen-free polycarbonates obtained in accordance with the invention.

In the process according to the invention it is again possible, as usual, to add adjuvants of all kinds, before, during or after the process of preparation. Examples which may be mentioned in this context are dyestuffs, pigments, mold release agents, stabilizers against the action of moisture, heat and UV, lubricants and fillers, such as glass powders, quartz products, graphite, molybdenum sulphide, metal powders, powders of higher-melting plastics, for example, polytetrafluoroethylene powder, natural fibers, such as cotton, sisal and asbestos, and also glass fibers of very diverse kinds, metal filaments and fibers which are stable when present in the melt of the polycarbonates and do not significantly damage the polycarbonates.

The thermoplastic, high-molecular weight, soluble and branched polycarbonates obtained according to the invention have relative viscosities $\eta_{rel}$ of about 1.230 to 1.450, measured on solutions of 0.5 g product in 100 ml of methylene chloride at 25° C., average molecular weights, measured by light scattering, of about 10,000 to 100,000 and apparent melt viscosities of about $10^4$ to $10^2$ (Pascal sec (=Pas)) at 300° C. and at rates of deformation of $10^0$ to $5.10^3$ $(\sec^{-1})$.

The polycarbonates according to the invention can be used both for processing by extrusion and processing by injection molding. Because of the excellent shape retention of the extrudate, they are also suitable for the manufacture of hollow articles by the blow-molding process. The excellent structural-viscosity properties make it possible readily to obtain, for example, extruded films having good mechanical properties and reduce stress-cracking.

Shaped articles, such as moldings of all kinds, such as housings, bobbins, covers, domestic appliances and the like can be manufactured by injection molding.

The percentages indicated in the Examples are by weight unless stated otherwise. The relative viscosities $\eta_{rel}$ were measured on 0.5 percent strength solutions in methylene chloride at 25° C. The apparent melt viscosities, measured in Pascal.sec. (=Pas) at the particular rate of deformation $(\sec^{-1})$ specified, were determined at 300° C. Further details are to be found in the Examples.

Preparation of 3,3-bis-(4-hydroxyphenyl)-oxindole 147 g of isatin and 470 g of phenol were brought together and heated to 85° C. Hydrogen chloride gas dried over sulphuric acid is then passed in at 85° C., during which the reaction temperature rises to 115° C. This temperature is maintained and hydrogen chloride is passed in for a further 5 hours. The resulting crystal paste is stirred into 500 ml of benzene and the crystals, colored light yellow, which are thereupon obtained are filtered off and dried. After recrystallization from acetone/chloroform and drying in a water pump vacuum at 90° C., 260 g (82% yield) of colorless crystals are obtained. Melting point 267° C.

$C_{20}H_{15}NO_3$ (317.35) Calculated C 75.7; H 4.73; N 4.41%. Found C 75.6; H 4.68; N 4.46%.

3,3-Bis-(4-hydroxyphenyl)-oxindole, described as isatin-bisphenol in the Examples which follow, corresponds to the formula

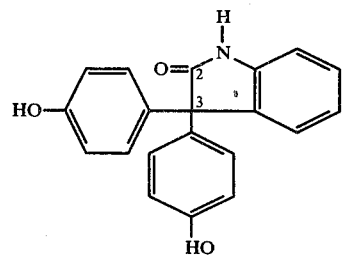

Preparation of 3,3-bis-(4-hydroxynaphthyl)-oxindole 147 g of isatin and 720 g of α-naphthol are brought together and initially heated to 100° C. Hydrogen chloride gas dried over sulphuric acid is then passed in, during which the temperature rises to 150° C. After the exothermic reaction has subsided the reaction temperature is maintained at 115° C. for a further 5 hours and after cooling, 1,000 ml of ethanol are added to the solidified crystal mass. The crystals, freed from excess phenol, are filtered off and dried. 334 g (80% yield) of colorless crystals are obtained from chloroform/acetone. Melting point 300° C., with decomposition.

$C_{28}H_{19}NO_3$ (417.47) Calculated C 80.60; H 4.55; N 3.36%. Found C 80.48; H 4.51; N 3.42%.

3,3-Bis-(4-hydroxynaphthyl)-oxindole corresponds to the formula

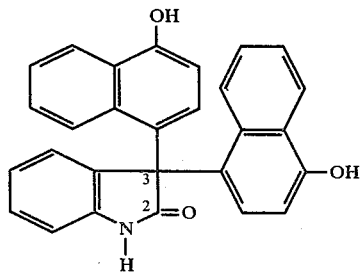

The following Examples illustrate the invention:

EXAMPLE 1

2.280 kg of bisphenol A (BPA) and 6.34 g of isatin-bisphenol (0.2 mol % of branching agent, based on the bisphenol A as 100 mol %) are dissolved in 21 kg of 6.2% strength sodium hydroxide solution under nitrogen. A solution of 38 g of p-tert.-butylphenol in 25 kg of unstabilized methylene chloride is added and 1.285 kg of phosgene are passed into the total reaction mixture over the course of 1 hour at 25° C., while stirring vigorously at pH 13–14. 6 g of triethylamine and 400 ml of 45% strength sodium hydroxide solution are then added and condensation is allowed to continue for a further hour. The organic phase is separated off and washed twice with 2% strength phosphoric acid, and then with water, either three times or until the aqueous phase is free from electrolyte. After distilling off the solvent, 2.45 kg of polycarbonate of relative viscosity $\eta_{rel}=1.419$ are obtained.

The DTA thermogram (DTA=differential thermal analysis) confirms that the branched polycarbonate is heat-stable up to at least 360° C.

The flow as a function of the preheat time also proves the heat stability of the polycarbonate. Over a period of 20 minutes, the apparent melt viscosity $\eta_m$ remaines constant at 67,000 Poise.

EXAMPLE 2

4.56 kg of BPA and 22.8 g of isatin-bisphenol (0.36 mol % of branching agent, relative to bisphenol A) are dissolved in 42 kg of 6.2% strength sodium hydroxide solution under nitrogen and a solution consisting of 84 g of p-tert.-butylphenol and 50 kg of unstabilized methylene chloride is added. While stirring vigorously, 2.57 kg of phosgene are passed in over the course of 1 hour at room temperature (pH of the solution 13–14). After adding 12 g of triethylamine and 850 ml of 45% strength sodium hydroxide solution the reaction is allowed to continue for a further hour. When the alkaline phase is free from bisphenol A, the phases are separated and the organic phase is washed twice with 2% strength phosphoric acid, and with water three times or until no further electrolyte is detectable in the wash water. 4.95 kg of branched polycarbonate are obtained from the organic phase after distilling off the solvent.

$\eta_{rel}=1.330 \quad M_\eta=34,700 \quad M_{LS}=49,300$ $M_{LS}$=molecular weight measured by light scattering.

COMPARISON EXPERIMENT A

A polycarbonate was prepared under the same conditions as in Example 2 except that no isatin-bisphenol was added as branching agent.

$\eta_{rel}=1.325 \quad M_\eta=34,500 \quad M_{LS}=34,900$

Example 2 and Comparison Experiment A indicate the high branching which is achieved by co-condensation of isatin-bisphenol in the polycarbonate, as can be seen from the difference of the molecular weights determined by viscosity measurement and by light-scattering measurement.

EXAMPLE 3

4.0 kg of bisphenol A, 11.12 g of isatin-bisphenol (0.2 mol % of branching agent, relative to the bisphenol A) and 1.32 g of sodium borohydride are dissolved in 21 kg of 6.2% strength sodium hydroxide solution under nitrogen. A solution of 72.3 g of p-tert.-butylphenol in 44.0 kg of (unstabilized) methylene chloride is added and 2.256 kg of phosgene are passed in to the reaction solution over the course of 1 hour at room temperature, while stirring vigorously and keeping the pH at 13–14. After adding 10.5 g of triethylamine and 300 ml of 45% strength NaOH, the reaction is allowed to continue for a further hour.

The organic phase is separated off and washed twice with 2% strength phosphoric acid, and with water three times or until the aqueous phase is free from electrolyte. The solvent is distilled off and 4.3 kg of polycarbonate of relative viscosity: $\eta_{rel}=1.340$ are obtained.

The color numbers of the polycarbonate were determined as follows:

The measurements on the previously prepared solution were carried out in a 5 cm thick cell with the sample exposed to monochromatic test illumination, standard light C, on a Hardy spectrograph (polycarbonate-free methylene chloride being placed in the comparator beam). The chosen concentration corresponds to a sheet thickness of 2.0 mm.

| Number of extrusions | 1 | 2 | 3 | 4 | 5 |
|---|---|---|---|---|---|
| Color number | 0.28 | 0.32 | 0.34 | 0.36 | 0.39 |

EXAMPLE 3a 4.0 kg of bisphenol A, 12.10 g of insatin-bis-o-cresol (described in German Patent Specification No. 406,210) (0.2 mol % of branching agent, relative to the amount of bisphenol) and 1.32 g of sodium borohydride are dissolved in 21 kg of 6.2% strength sodium hydroxide solution under nitrogen. A solution of 72.3 g of p-tert.-butylphenol and 44.0 kg of (unstabilized) methylene chloride is added and 2.256 kg of phosgene are then introduced over a period of 1 hour at room temperature. The pH value is 13–14 during the phosgenation. After adding 10.5 g of triethylamine and 300 ml of 45% strength NaOH condensation is allowed to continue for a further hour.

The working up procedure consists of separating off the organic phase, washing it twice with 2% strength phosphoric acid and with water three times or until the aqueous phase is free from electrolyte. After drying and distilling off the solvent 4.2 kg of a branched polycarbonate are obtained with a solution viscosity of $\eta_{rel}=1.332$.

After complete saponification and chromatographic separation 0.2 mol % of isatin-bis-o-cresol are able to be identified as evidence of the complete incorporation of the branching agent. The remaining properties such as mechanical behaviour, thermostability even after multiple extrusion, intrinsic viscosity, flame resistance after the addition of 0.005–1% by weight of alkali metal perfluoroalkane ($C_1$–$C_8$)-sulphonates and/or ammonium perfluoroalkane ($C_1$–$C_8$)-sulphonates etc. correspond to the values of a polycarbonate branched with the same amount (0.2 mol %) of isatin-bisphenol.

COMPARISON EXPERIMENT B

A branched polycarbonate was prepared in accordance with the same process as in Example 3, but using 21.6 g of tris-cresol (2,6-bis-(2'-hydroxy-5'-methylbenzyl)-4-methylphenol) (0.2 mol %, relative to bisphenol A) instead of isatin-bisphenol as the branching agent. The color number was determined analogously to Example 3.

| Number of extrusions | 1 | 2 | 3 | 4 | 5 |

| -continued | | | | | |
|---|---|---|---|---|---|
| Color number | 0.31 | 0.45 | 0.51 | 0.58 | 0.67 |

It can be seen clearly that, while the initial color number is about the same, the color number of the polycarbonate prepared according to the invention only changes slightly after 5 extrusions, while with the polycarbonate from the comparison experiment a very marked change in the color number can be observed after 5 extrusions, which excludes use of the material for repeated extrusions.

EXAMPLE 4

3.030 kg of bisphenol A, 22.3 g of isatin-bisphenol (0.5 mol %, relative to the sum of bisphenol A and tetrabromobisphenol A) and 1 g of sodium borohydride are dissolved in a solution of 24.9 kg of water and 2.250 kg of 45% strength sodium hydroxide solution, and 67.6 g of p-tert.-butylphenol in 34.8 kg of unstabilized methylene chloride are added. 2.070 kg of phosgene are passed in over the course of one hour at 25° C., with vigorous stirring, and thereafter a solution of 427 g of tetrabromobisphenol A in 2.4 kg of 6.2% strength sodium hydroxide solution is added. In the course thereof, the pH value of the reaction solution should be kept at 10–11. After adding 60 ml of triethylamine, the reaction is allowed to continue for a further hour. The organic phase is separated off and washed twice with 2% strength phosphoric acid, and with water three times or until no further electrolyte is detectable. After concentrating the organic phase, 3.75 kg of polycarbonate containing bromine (bromine content 5.8% by weight) and having a relative viscosity $\eta_{rel}=1.284$ are obtained.

Burning characteristics:
UL Subject 94   1/16 inch   94 v-0 (best possible value).
IBM test (DMH 6-0430-102) Cl. A, 4 mm/60 sec.

According to the IBM test, the test bar must be flamed for 60 seconds before the material begins to produce burning drips or continues to burn for more than 30 seconds.

COMPARISON EXPERIMENT C

A polycarbonate containing bromine (5.8% by weight of bromine) is prepared in accordance with the same process as in Example 4, but without addition of branching agent.

Burning characteristics:
UL Subject 94   1/16 inch   94 V-2
IBM test (DMH6-0430-102) Cl. B, 4 mm/35 sec.

In the case of the unbranched polycarbonate, the formation of burning drips and the continuation of burning for more than 30 seconds commences after only 35 seconds (flaming) and hence substantially earlier than for the grades of material branched via isatin-bisphenol.

EXAMPLE 5

228 g of bisphenol A, 227 g of diphenyl carbonate and 0.634 g of isatin-bisphenol (0.2 mol %, relative to the bisphenol A) are fused, together with 0.2 mg of sodium bisphenolate, in an oxygen-free atmosphere, the temperature being raised from 200° C. to 300° C. over the course of 5 hours, while the pressure is lowered from 100 mm Hg to 2 mm Hg. After distilling off the phenol produced in the transesterification, a transparent polycarbonate of relative viscosity $\eta_{rel}=1.265$ is obtained.

EXAMPLE 6

The dependence of the apparent melt viscosity on the rate of shear was determined at 300° C. (nozzle L/D 20) for the polycarbonates prepared in Example 4 and Comparison Experiment C, in order to make clear the pronounced structural viscosity of the polycarbonates according to the invention.

(a) Polycarbonate according to Example 4

| Apparent melt viscosity (Pas) | 3,900 | 3,300 | 2,250 | 1,750 | 900 | 650 |
|---|---|---|---|---|---|---|
| Rate of deformation (sec$^{-1}$) | 2 | $10^1$ | $5\times10^1$ | $10^2$ | $5\times10^2$ | $10^3$ |

(b) Polycarbonate according to Comparison Experiment C

| Apparent melt viscosity (Pas) | 1,100 | 1,100 | 1,100 | 1,080 | 900 | — |
|---|---|---|---|---|---|---|
| Rate of deformation (sec$^{-1}$) | 2 | $10^1$ | $5\times10^1$ | $10^2$ | $5\times10^2$ | $10^3$ |

EXAMPLE 7

Burning Characteristics of Compositions According to the Invention

A polycarbonate (relative viscosity $\eta_{rel}$ 1.343) which was prepared analogously to Example 4, but without tetrabromobisphenol A, using 0.5 mol %, relative to bisphenol A, of isatin-bisphenol as a branching agent, and which contained 0.1% by weight of potassium perfluorobutanesulphonate, relative to polycarbonate, as a flameproofing agent, was subjected to the burning test according to Subject 94 of Underwriter's Laboratories, U.S.A.

Result: even with a minimum wall thickness of specimen provided in this test, namely 1/16 inch, the material was classified in the best rating category, namely: 94 V-0. (No burning drips. Burning continues for <5 seconds).

COMPARISON EXPERIMENT D

The polycarbonate from Example 7, but without added potassium perfluorobutanesulphonate, was examined by the Subject 94 burning test of Underwriters' Laboratories, U.S.A.

Result: at 1/16 inch wall thickness the material was not classified as a plastic of low inflammability, since the time for which it continued burning was too long (>30 seconds).

EXAMPLE 8

Processing by Injection Molding

Linear polycarbonates based on bisphenol A, prepared according to the phase boundary process (see H. Schnell "Chemistry and Physics of Polycarbonates" Interscience Publisher (1964) page 33) and having a relative viscosity $\eta_{rel}$ of about 1.290 are processed in the usual manner at 280° C., using certain settings of the injection molding machine (injection pressure, injection speed and the like) to give standard thin-walled test specimens (length 127 mm, width 42.7 mm, thickness 1.6 mm). At lower temperatures, problems in filling the mold arise. The apparent melt viscosity of such a product is about $6.10^2$ Pas at a low rate of deformation ($D \sim 5$ sec$^{-1}$)..

The branched polycarbonate described in Example 7 could be converted to the thin-walled test specimens mentioned under the same machine conditions, because of the pronounced structural viscosity of the polycarbonate, even though its apparent melt viscosity ($5.5 \times 10^3$ Pas) at a low rate of deformation of $\sim 5$.sec$^{-1}$ was almost 10 times greater.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as it may be limited by the claims.

What is claimed is:

1. A process for the preparation of a thermoplastic, branched-chain, high molecular weight, soluble polycarbonate comprising condensing a difunctional aromatic halogen-free or halogen-containing dihydroxy compound or a mixture thereof in the presence of from about 0.05 to 2 mol % of a branching agent and from about 0.1 to 8.0 mol % of a monofunctional aromatic hydroxy compound, in each case relative to the mols (100 mol %) of the difunctional aromatic dihydroxy compound, with phosgene, a bis-chlorocarbonic acid ester or another compound which forms carbonate groups, in solution or by means of a phase boundary reaction, at a temperatre of from about 20° to 80° C., or with a carbonic acid diaryl ester in the melt at a temperature of from about 150° to 300° C., the said branching agent being a 3,3-bis-(4-hydroxyaryl)-oxindole of the formula (I):

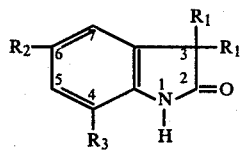

wherein
R$_1$ denotes a 4-hydroxyaryl radical and
R$_2$ and R$_3$ can be identical or different and denote hydrogen or halogen atoms.

2. The process according to claim 1 wherein R$_1$ denotes a 4-hydroxynaphthyl radical or a radical of the formula (II):

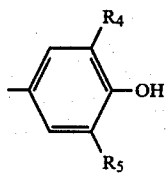

wherein
R$_4$ and R$_5$ can be identical or different and denote hydrogen or halogen atoms or methyl or ethyl groups.

3. The process according to claim 2 wherein R$_1$ denotes 4-hydroxyphenyl.

4. The process according to claim 1 wherein the monofunctional aromatic hydroxy compound comprises a monophenol.

5. The process according to claim 4 wherein the monophenol is p-tert.-butylphenol.

6. The process according to claim 1 wherein the difunctional aromatic dihydroxyl compound comprises a bisphenol.

7. The process according to claim 6 wherein the difunctional aromatic dihydroxyl compound comprises 4,4'-dihydroxydiphenylpropane-2,2 or a halogenated derivative thereof.

8. The process according to claim 7 wherein the difunctional aromatic dihydroxyl compound comprises a mixture of from about 98 to 70 mol % of 4,4'-dihydroxydiphenyl propane-2,2, and from about 2 to 30 mol % of tetrahalogeno-4,4'-dihydroxydiphenylpropane-2,2.

9. The process of claim 8 wherein the tetrahalogeno aromatic dihydroxyl compounds are selected from the group consisting of 2,2-bis-(3,5-dichloro-4-hydroxyphenyl) propane and 2,2-bis-(3,5-dibromo-4-hydroxyphenyl) propane.

10. The product of the process of claim 8.

11. The process according to claim 1 wherein the aryl groups of the carbonic acid diaryl ester are optionally halogenated or optionally alkylated naphthyl or phenyl groups.

12. A thermoplastic branched-chain, high molecular weight, soluble polycarbonate prepared by the process of claim 1.

13. A polycarbonate according to claim 12, containing 0.005 to 1% by weight of a compound selected from the group consisting of alkali metal perfluoroalkane-(C$_1$-C$_8$)-sulphonates and ammonium perfluoroalkane-(C$_1$-C$_8$)-sulphonates.

14. An extruded or injection-molded article manufactured from a polycarbonate according to claim 12.

15. In a process for the preparation of a high molecular weight branched polycarbonate substantially free of cross linking comprising reacting a carbonic acid derivative with aromatic dihydroxy compounds, from about 0.05 to about 2 mol % of a branching agent and about 0.1 to about 8 mol % of a monohydric phenol (the mol percentages being based on the mols of the aromatic dihydroxy compound), the improvement wherein the branching agent is a 3,3-bis-(4-hydroxyaryl)-oxindole.

16. A thermoplastic high molecular weight polycarbonate having a relative viscosity of about 1.230 to 1.450 measured in a solution of 0.5 g in 100 ml of methylene chloride at 25° C. and an average light scattering molecular weight, M$_{LS}$, of about 10,000 to 100,000 said polycarbonate being branched by about 0.05 to 2 mol % of a 3,3-bis-(4-hydroxyaryl)-oxindole.

17. A high molecular weight branched polycarbonate substantially free of crosslinking which comprises a polycarbonate polymer containing residues of aromatic dihydroxy compounds, about 0.05 to 2 mol % of a 3,3-bis-(4-hydroxyaryl)-oxindole of the formula

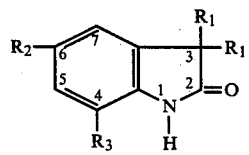

wherein $R_1$, $R_2$ and $R_3$ have the same meaning as in claim 1 and about 0.1 to about 8 mol percent of a monohydric phenol, the mol percentages being based on the mols of the aromatic dihydroxy compounds, said branched polycarbonate having an average molecular weight by light scattering, $M_{LS}$ of about 10,000 to 100,000.

18. The polycarbonate of claim 17 wherein the aromatic dihydroxy compounds comprise about 98 to 70 mol % 2,2-bis-(4-hydroxyphenyl) propane and about 2 to 30 mol % of tetra halogenated 2,2-bis-(4-hydroxyphenyl)propane.

19. A flame retardant thermoplastic molding resin comprising the polycarbonate of claim 17 wherein the aromatic dihydroxy compounds are 2,2-bis-(4-hydroxyphenyl)propane and about 0.005 to 1 wt.% of a flame retardant selected from the group consisting of $C_1$–$C_8$ alkali metal perfluoroalkane sulphonates and $C_1$–$C_8$ ammonium perfluoroalkane sulphonates.

20. The process according to claim 1 wherein $R_2$ denotes hydrogen.

21. The process according to claim 1 wherein $R_3$ denotes hydrogen.

22. The process according to claim 1 when $R_2$ and $R_3$ denote hydrogen.

23. The process for the preparation of a thermoplastic, branched-chain, high molecular weight, soluble polycarbonate comprising condensing a difunctional aromatic halogen-free or halogen-containing dihydroxy compound or a mixture thereof in the presence of from about 0.05 to 2 mol % of a branching agent and from about 0.1 to 8.0 mol % of a monofunctional aromatic hydroxy compound, in each case relative to the mols (100 mol %) of the difunctional aromatic dihydroxy compound, with phosgene, a bis-chlorocarbonic acid ester or another compound which forms carbonate groups, in solution or by means of a phase boundary reaction, at a temperature of from about 20° to 80° C., or with a carbonic acid diaryl ester in the melt at a temperature of from about 150° to 300° C., the said branching agent being a 3,3-bis-(4-hydroxyaryl)-oxindole of the formula (I):

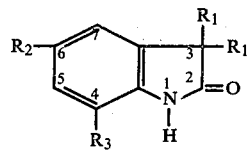

wherein
$R_1$ is a radical of the formula

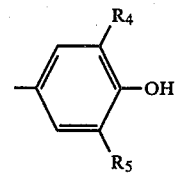

wherein
$R_4$ and $R_5$ can be identical or different and denote methyl or hydrogen, and
$R_2$ and $R_3$ are hydrogen.

24. A high molecular weight branched polycarbonate substantially free of crosslinking which comprises a polycarbonate polymer containing residues of aromatic dihydroxy compounds, about 0.05 to 2 mol % of a 3,3-bis-(4-hydroxyaryl)-oxindole of the formula

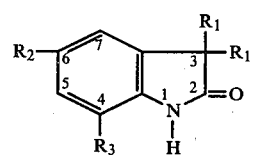

wherein
$R_1$ is a radical of the formula

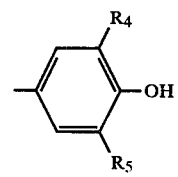

wherein
$R_4$ and $R_5$ can be identical or different and denote methyl or hydrogen, and
$R_2$ and $R_3$ are hydrogen, and about 0.1 to about 8 mol percent of a monohydric phenol, the mol percentages being based on the mols of the aromatic dihydroxy compounds, said branched polycarbonate having an average molecular weight by light scattering, $M_{LS}$ of about 10,000 to 100,000.

* * * * *